T. E. MURRAY.
APPARATUS FOR TRUING AND REMOVING THE BUR FROM ELECTRICALLY WELDED WORK.
APPLICATION FILED MAR. 28, 1918.
1,286,064. Patented Nov. 26, 1918.
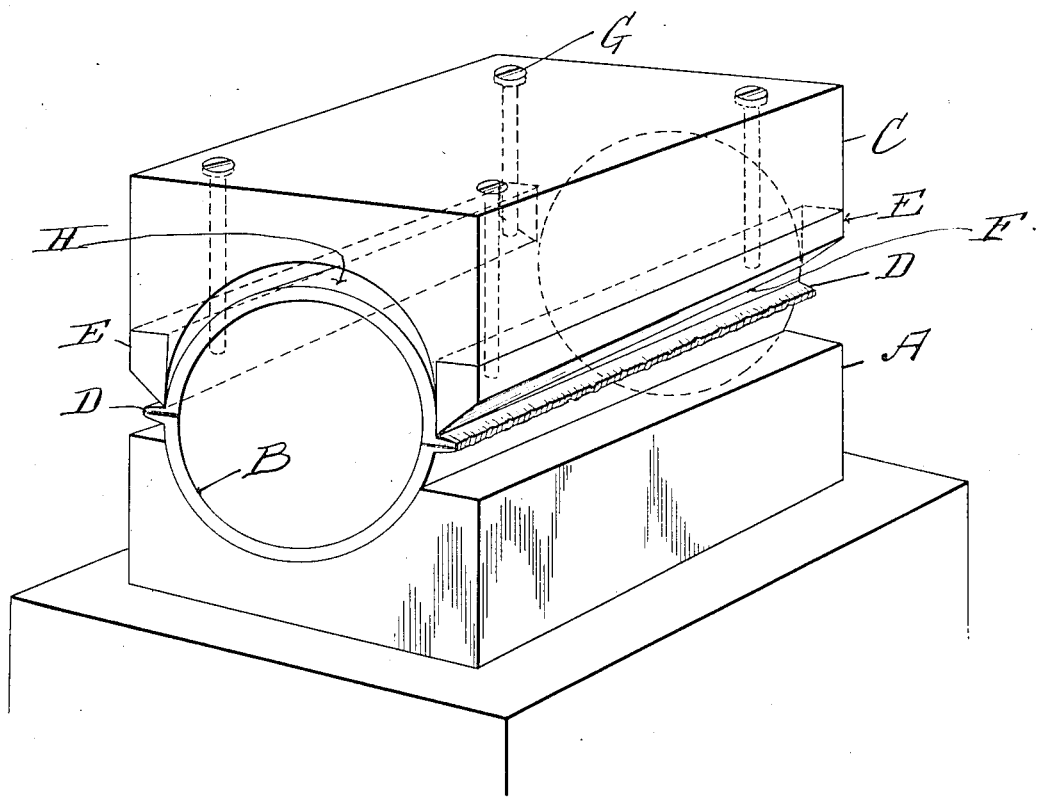
INVENTOR
Thomas E. Murray
BY Park Benjamin
his ATTORNEY

UNITED STATES PATENT OFFICE.

THOMAS E. MURRAY, OF NEW YORK, N. Y.

APPARATUS FOR TRUING AND REMOVING THE BUR FROM ELECTRICALLY-WELDED WORK.

1,286,064.    Specification of Letters Patent.    Patented Nov. 26, 1918.

Application filed March 28, 1918. Serial No. 225,158.

*To all whom it may concern:*

Be it known that I, THOMAS E. MURRAY, a citizen of the United States, residing at New York, in the county of New York and State of New York, have invented a certain new and useful Improvement in Apparatus for Truing and Removing the Bur from Electrically-Welded Work, of which the following is a specification.

When two hollow or recessed bodies are electrically welded together edge to edge, under pressure, the metal extruded at the joint usually forms a bur on the outside, which bur requires an additional grinding or chiseling operation in order to remove it. To avoid the expense and loss of time usually involved in this proceeding, I have devised the present invention, whereby the whole bur on the electrically welded work may be removed at a single operation. At the same time, the work may be trued to correct any distortion due to the previous welding.

The accompanying drawing is a perspective view of my truing and bur trimming device, the work here being a tube or cylinder on which the bur has been formed by the extruded metal along the electrically welded joint uniting two half sections.

A is a supporting block having a semi-cylindrical recess in which the work B is seated. C is the movable upper block, which is placed above and separated from the block A. The work B is seated in semi-cylindrical recesses in blocks A and C, so that the extruded burs D project horizontally into the space between said blocks and are separated by intervals from said blocks, so that when said burs are cut off, as hereinafter described, they are unsupported by anything except the work itself. The block C is shouldered on each side to receive a knife E, the inner flat side of which is vertical and tangent to work B, so that the cutting edge F of said knife acts upon the burs so as to divide the same close to the work surface. Said cutting edge is longitudinally inclined to produce the desired shearing cut. The two knives E extend below the recess in upper block C and are secured in the shouldered edges of block C by screws G passing down through the body of said block. By releasing said screws, said knives may be removed for replacement or sharpening.

The operation is as follows:

The work being seated in the block A, block C is placed thereon. The corresponding ends of the knives E then make contact with the burs D, so that there is a clearance H in the recess above said work. The block C is then forced downwardly by any suitable means, so that the longitudinally inclined cutting edges of the knives E are caused to shear off the said burs close to the work surfaces. At the same time, the clearance H disappears, and finally the work becomes compressed or molded between the blocks A and C, and so trued by being made to conform to the truly cylindrical shape of the approximated recesses in said blocks. In this way, any distortion of the work due to previous welding is corrected.

While I have here shown my invention embodied in means for removing the longitudinal burs on opposite surfaces of a cylinder, it is to be understood that I do not limit my invention to that specific work. It is equally applicable to burs produced circumferentially around a sphere formed by welding together two hemispherical cups, or to burs extending around all sides of two welded semi-polygonal objects, the knives, of course, being suitably shaped.

The knives may be secured in the block A, if desired, so as to act upon the under side of the burs D.

I claim:

1. An apparatus for removing extruded burs on electrically welded work, comprising an upper block and a lower block separated from one another and having recesses wherein said work is seated, the said burs laterally protruding in the space between said blocks and separated by an interval from both of said blocks, and shearing knives on one of said blocks extending beyond the recess therein and having their cutting edges tangent to said work, whereby upon the forcing together of said blocks, said knives are caused to shear said bur from said work.

2. An apparatus as set forth in claim 1, the said shearing knives being seated against shoulders formed in the outer edges of the block in which they are placed.

3. An apparatus as set forth in claim 1, further including means for detachably securing said knives to said block.

4. An apparatus as set forth in claim 1, the said knives having inclined edges, whereby the removal of the bur is progressively effected from end to end.

In testimony whereof I have affixed my signature in presence of two witnesses.

THOMAS E. MURRAY.

Witnesses:
GERTRUDE T. PORTER,
MAY T. McGARRY.